(12) United States Patent
Walton et al.

(10) Patent No.: US 7,453,600 B1
(45) Date of Patent: Nov. 18, 2008

(54) TEXT REGION IDENTIFICATION AND ENHANCEMENT DURING COLOR COPY

(75) Inventors: Derek T. Walton, Bolton, MA (US); Gyung Nam Boo, Lexington, MA (US)

(73) Assignee: Conexant Systems, Inc., Newport Beach, CA (US)

( * ) Notice: Subject to any disclaimer, the term of this patent is extended or adjusted under 35 U.S.C. 154(b) by 730 days.

(21) Appl. No.: 11/032,615

(22) Filed: Jan. 10, 2005

Related U.S. Application Data

(60) Provisional application No. 60/535,403, filed on Jan. 9, 2004.

(51) Int. Cl.
*H04N 1/60* (2006.01)
*H04N 1/40* (2006.01)

(52) U.S. Cl. .................. 358/1.9; 358/462

(58) Field of Classification Search ............. 358/1.1, 358/1.2, 1.9, 2.1, 2.99, 3.11, 3.12, 3.27, 3.31, 358/1.11, 1.18, 512, 515, 516, 517, 518, 358/519, 448, 452, 453, 462, 464, 502, 529, 358/532, 1.7, 1.8; 382/162, 164, 165, 167, 382/170, 177, 176, 178, 199, 173, 224
See application file for complete search history.

(56) References Cited

U.S. PATENT DOCUMENTS

| | | | | |
|---|---|---|---|---|
| 5,428,377 A | * | 6/1995 | Stoffel et al. | 347/15 |
| 5,881,210 A | * | 3/1999 | Guay et al. | 358/1.9 |
| 5,923,349 A | * | 7/1999 | Meyer | 347/43 |
| 7,079,686 B2 | * | 7/2006 | Ahmed et al. | 382/176 |
| 7,286,263 B2 | * | 10/2007 | Ogasawara et al. | 358/1.9 |

* cited by examiner

*Primary Examiner*—Dov Popovici
(74) *Attorney, Agent, or Firm*—John R. Thompson; Stoel Rives LLP

(57) ABSTRACT

There is provided a method for enhancing text reproduction by a color copier in a copy of a document that includes both text and graphic regions, the method includes creating an ink density map from a data image of the document identifying a region of the ink density map as a text region, a partial text region, a color region or a white region and modifying the data image for corresponding regions identified as text areas.

20 Claims, 1 Drawing Sheet

TEXT REGION IDENTIFICATION AND ENHANCEMENT DURING COLOR COPY

REFERENCE TO PRIOR PATENT APPLICATION

This patent application claims benefit of prior U.S. Provisional Patent Application Ser. No. 60/535,403, filed Jan. 9, 2004 by Derek T. Walton et al. for TEXT REGION IDENTIFICATION AND ENHANCEMENT DURING COLOR COPY.

The above-identified patent application is hereby incorporated herein by reference.

FIELD OF THE INVENTION

This invention relates to office automation products in general, and more particularly to printers, fax machines, scanners, copiers and the like. Even more particularly, this invention relates to the integration of formerly separate functions into single devices such as those sometimes referred to as MFPs (Multi-Functional-Peripherals), and the integration of multiple functions into a single ASIC (Application Specific Integrated Circuit) such as those produced by Oasis Semiconductor, Inc. of Waltham, Mass.

BACKGROUND OF THE INVENTION

The Problem

When performing a color copy of a mixed text and photo document, the simplest image processing strategy is to operate on the scanned image using a single, fixed sequence of processing steps (e.g., filter, horizontal and vertical scale, color space convert, adjust for writing system tonal response and halftone) not considering variations in image content from region to region. Such a strategy has the disadvantage that black text regions are not typically reproduced in a manner which creates nice black text characters. Rather, the characters tend to be dark, but not completely black, and also tend to be composed of both color and black inks, rather than pure black inks. The inclusion of color ink in the text characters both contributes to the character's lack of "blackness" and, especially for ink jet printing systems, reduces print speed. This is because most ink jet systems are designed to provide much faster printing when just black ink is used. This is achieved via a combination of optimizations, including larger black ink nozzle plates (which cover larger areas of paper with each carrier pass) and larger black ink drops (fewer drops are required to cover an area of paper).

Prior Art Approaches

It is well recognized in the industry that better copy quality can be obtained if an image can be successfully segmented into photo and text regions, and subsequently processed in a way that applies different image processing techniques to each region.

In general, these approaches are believed to make the photo/text classification based on an analysis of image data in its continuous tone form, i.e., in a raw form close to that of the input RGB (Red Green Blue) scan data. Once the photo/text determination is made, the continuous tone regions of the image are subsequently sent down the remainder of the image processing pipeline (filter, scale, color space convert, halftone) with different settings used for each region. The output of this processing is, for instance, the CMYK (Cyan Magenta Yellow black) bitonal data which is to be sent to the print engine (perhaps after ink jet formatting is performed).

While there are benefits to making the photo/text determination based on image data in continuous tone form, techniques of this type require significant processing resources (or at least processing which is not convenient within many chips).

Goal

Thus, there is a need for a new system for making a photo/text determination without requiring significant or inconvenient processing resources.

SUMMARY OF THE INVENTION

The present invention provides a novel approach to text region identification and enhancement. A fundamental element of the present invention is that the text detection and enhancement is performed AFTER the bulk of the image processing has been completed. In particular, the identification and enhancement is performed after the image has been converted into the CMYK representation which will be delivered to the print system. In this manner, useful detection/enhancement of the text region can be achieved with only modest processing requirements.

In one form of the present invention, there is provided a method for enhancing text reproduction by a color copier in a copy of a document that comprises both text and graphic regions, the method comprising the steps of:

(a) creating an ink density map from a data image of the document, wherein the data image comprises at least one plane of data for each of ink types cyan, magenta, yellow and black; and wherein the ink density map comprises rectangular regions of the image; and for each of the rectangular regions indicates the number of black ink drops and colored ink drops contained therein;

(b) identifying a region of the ink density map as a text region, a partial text region, a color region or a white region based upon one or more of:

(i) the number of ink drops in the region;

(ii) the type of ink drops in the region;

(iii) the number of ink drops in regions adjacent to the region being identified; and (iv) the type of ink drops in regions adjacent to the region being identified; and (c) modifying the data image for corresponding regions identified as text areas by one or more of:

(i) converting a cyan, magenta, or yellow drop of ink that is a part of a text character to a black dot of ink; and (ii) modifying the black plane of data of the data image to convert any non-black pixel adjacent to a black pixel to a black pixel.

In another form of the present invention, there is provided a computer chip capable of controlling the enhancement of text reproduction by a color copier in a copy of a document that comprises both text and graphic regions, the computer chip comprising hardware capable of generating an ink density map, wherein the ink density map comprises rectangular regions of the image; and wherein for each of the rectangular regions indicates the number of black ink drops and colored ink drops contained therein.

BRIEF DESCRIPTION OF THE DRAWINGS

Understanding that drawings depict only typical embodiments and are not therefore to be considered to be limiting of its scope, the embodiments herein are described and explained with additional specificity and detail through the use of the accompanying drawing in which.

DETAILED DESCRIPTION OF THE PREFERRED EMBODIMENTS

Figure 1:
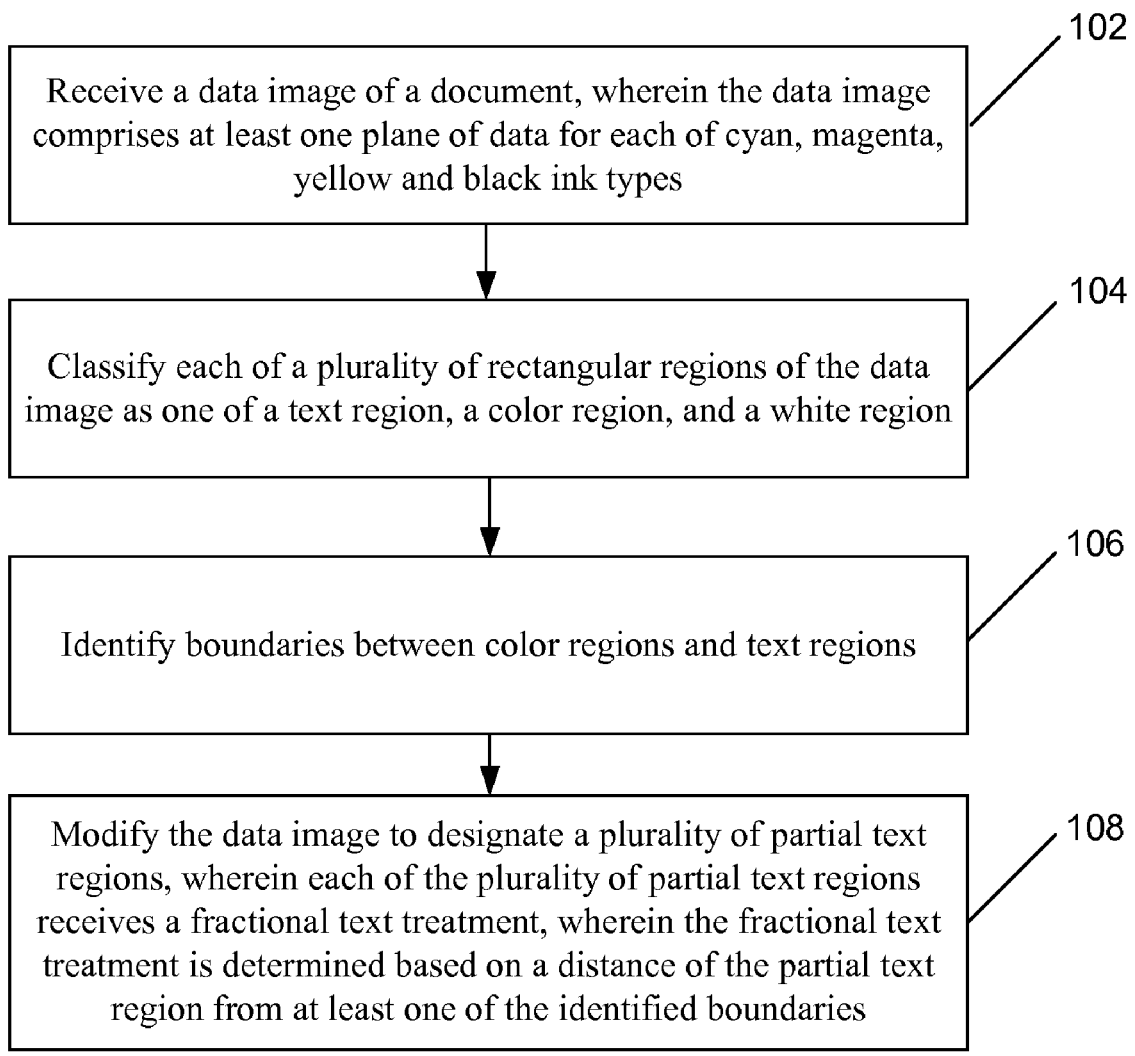
FIG. 1 is a flow diagram of a method of identifying and enhancing a text region.

The present invention provides a novel approach to text region identification and enhancement. A fundamental element of the present invention is that the text detection and enhancement is performed AFTER the bulk of the image processing has been completed. In particular, the identification and enhancement is performed after the image has been converted into the CMYK representation which will be delivered to the print system. In this manner, useful detection/enhancement of the text region can be achieved with only modest processing requirements.

The input to the text identification and enhancement process is the CMYK representation which will be delivered to the print system. In a preferred embodiment, this CMYK data consists of 4 planes of bitonal data, one each for ink type: C (Cyan), M (Magenta), Y (Yellow), and K (blacK). Alternate input data formats such as multi-bit components or additional image layers (e.g., for light C or M inks) can also be accommodated by this technique.

This CMYK data is converted to an ink density map. The ink density map breaks the image down into rectangular regions, preferably 16×16 or 32×32 pixel arrays. For each of the rectangular regions, the number of ink drops are counted and categorized. In one embodiment, the ink drops are categorized as being colored (cyan, magenta or yellow grouped together) or black. In a preferred embodiment, the drops are categorized by the type of ink: cyan, magenta, yellow or black, each quantitated separately.

The regions within the ink density map are then classified based upon (i) the number of ink drops in the region; (ii) the type of ink drops in the region; (iii) the number of ink drops in regions adjacent to the region being identified; and (iv) the type of ink drops in regions adjacent to the region being identified. In this manner, a text region can be distinguished from a non-text region. Text regions may be further characterized as full-text regions or partial-text regions. Non-text regions may be further categorized as a color region or a white region. The term "adjacent" as used herein means immediately above, immediately below, immediately to the left and immediately to the right of the region being mapped.

The identification of a region as a text or non-text region can be achieved according to many different algorithms based upon ink density map information about that region and adjacent regions.

In a preferred embodiment, this is achieved by classifying each region of the ink density map into one of the following four categories: (i) no dots of any ink type; (ii) a few interspersed dots of any ink type; (iii) mostly black dots; or (iv) mostly color dots. The manner in which ink density for a region is translated to fit into one of these categories is fully programmable.

Classifications having fewer or greater categories are also within the scope of this invention. The goal of the classification is to be useful in accurately identifying text regions for the next steps in the method of this invention. In the preferred embodiment above, a region of mostly black dots is designated as a text region if it is horizontally adjacent to a region categorized as having no dots or few dots. The term horizontally adjacent, as used herein, means immediately to the left or right of the region being mapped. A region of mostly black dots is also designated as a text region if it is horizontally adjacent to a region capable of being classified as a text region. Furthermore, a region of a few interspersed drops of any ink type may also be designated as a text region if it is horizontally adjacent to a region capable of being classified as a text region. Specific examples of text region determinations are set forth in the examples below.

As used herein, the term "a region capable of being classified as a text region" means a region of mostly black dots which is designated as a text region if it is horizontally adjacent to a region categorized as having no dots or few dots. The term is used to make clear that there is no requirement that a first region be already designated as a text region prior to a horizontally adjacent second region being given that designation, or vice versa. The algorithms used to make these designations are not necessarily based upon some ordered designation of regions.

Partial text regions may also be identified through the use of various algorithms and based upon the ink density map or characterizations of the regions within that map. In a preferred embodiment, partial text designation requires the creation of a text identification map and subsequent feathering of text/color region interfaces.

A text identification map classifies each region of the ink density map as being: devoid of any dots (i.e., "white"), text or color. The color classification in the text identification map is given to any non-text region containing any type of colored dots.

Once the text identification map is created, text regions within two regions of a color region in a row of regions are targeted for feathering. Feathering involves the treatment of a region as a partial text/partial color region. This region is designated as "partial text" and is subject to pro-rata treatment in subsequent text region modification steps, as described below.

The next step of the process involves enhancing the blackness of a text region. This is achieved in multiple ways. First every cyan, magenta or yellow drop of ink that is a part of a text character in a text region is converted to a black dot of ink. Preferably, a cyan, yellow or magenta drop of ink is determined to be part of a text character if any adjacent pixel comprises a drop of any color ink.

The second step in enhancing blackness is achieved by modifying the black plane of data of the data image to convert any non-black pixels adjacent to a black pixel to a black pixel. This can be achieved in a number of different ways. Preferably it is achieved through jittering the position of the black pixel through programmable instructions, as exemplified below.

The final step is to eliminate any cyan, magenta or yellow drop of ink that is not part of a text character.

In accordance with the present invention, an optional output of the above text identification/enhancement process is a summary map which classifies regions of the output image in terms of the ink usage. Each region in the output image is classified as one of the following: (i) no ink (i.e., a completely white region), (ii) black ink only, or (iii) at least some color ink (and, optionally, black ink). In another embodiment, the classification may include a fourth category of color ink only. The summary map can be used by downstream logic to accelerate the printing process.

According to one example of the present invention, the text identification/enhancement comprises the following.

Tailor The Color Table

Optional

The optional first step in the text identification/enhancement process is to tailor the color table to be used in mapping from RGB to CMYK. This table can be tailored such that for RGB tone regions associated with black text, the output CMYK quad-stimulus is arranged such that a true black (obtained via K ink) is favored over composite black (i.e., black synthesized via combinations of CMY inks). The extent to which the color table needs to be tailored will depend on tuning preference. In general, the more that K ink is favored over composite black, the easier it will be to identify/enhance text in subsequent processing steps. It is advantageous to favor K over composite black more strongly in the darkest and most neutral (i.e., grey) RGB tones, and favor less strongly in not so dark regions, or regions which are dark, but not neutral. This enables good text identification/enhancement with negligible impact on the reproduction of other color tones.

Create Ink Density Map

Next, from the input CMYK data, an ink density map is created which represents the number of dots of each type of ink within rectangular regions of the image. A region size of 16×16 or 32×32 pixels is typical. Hardware within the chip can be used to create the ink density maps in hardware as part of the halftoning process.

Classify Regions

Next, regions of the image are classified based on the dot counts from the ink density maps. Typically, it is preferred to classify the regions as one of four different types: (i) pure-white, (ii) lightTone (i.e., few, interspersed drops), (iii) mostlyK (i.e., mostlyK drops with allowance for some color drops), and (iv) color. There are a large variety of metrics which may be used in performing the classification. Moreover, the details of how the classification is best performed depend to a large extent on the characteristics of the writing system. Thus, the details of the classification, while interesting, are not a primary focus of the present invention.

The classification which has been used for a particular ink jet system is as follows:

if (sumOverRegion(c,m,y,k)==0
   region=pureWhite;

else if (sumover3×3(c,m,y,k)<Constant0
   region=lightTone;

else if (
   (sumOver3×3(c,m,y,k)<Constant1) &&
   (sumOver3×3(k)>sumOver3×3(c,m,y)/Constant2)||
   (sumOver3×3(k)/sumover3×3(c,m,y,k)>Constant3) &&
   max(sumOver3×3(c),sumOver3×3(m),sumOver3×3(y))
     <Constant4)
   region=mostlyK;

else
   region=color;

where the sumOver3×3 function computes the sum of the specified components over the 3×3 region area centered on the region currently being classified, and Constant0, . . . , Constant4 are parameters which can be adjusted to tune behavior of the algorithm.

Identify Text Areas

Next, the classified region map is inspected to identify areas of text.

In a preferred technique (of course many variations can be imagined) analysis is performed a row of regions at a time. First from left-to-right, and then from right-to-left, the rows are traversed. A series of rules are used to identify text regions. In general, the rules serve to indicate a text area when a mostlyK region is found next to a white or light region. Other mostlyK regions bounding these text-designated K regions are also designated as text regions. Furthermore, light regions that are adjacent to regions indicated as text under the previous rule are also indicated as text. For instance, text regions are identified in the following five separate rows as follows:

{white, white, mostlyK, mostlyK, mostlyK, color, color}==>{ , ,T,T,T, , }

{white, light, mostlyK, mostlyK, mostlyK, color, color}==> { ,T,T,T,T, , }

{color, color, mostlyK, mostlyK, color, color, color}==> { , , , , , , }

{white, light, light, light, light, color, color}==>{ , , , , , , }

{white, light, light, light, light, white, white}==>{, , , , , , } where T corresponds to areas which have been identified as text.

The text identifications for both left-to-right and right-to-left passes are then combined into a text identification map, and augmented to include indications for regions which are pure white (W) and regions which contain color drops (C). Within this map, mostlyK and lightTone regions which have not been identified as text will be indicated as containing color drops (C).

For instance, the output text identification map may look like:

W,W,W,W,W,W,W,W,W,W,W,W,W,W,W,W,W
W,W,W,W,W,W,W,W,W,W,W,W,W,W,W,W,W
W,W,T,T,T,T,T,T,T,T,T,T,T,T,W,W,W
W,W,T,T,T,T,T,T,T,T,T,T,T,T,W,W,W
W,W,T,T,T,T,T,T,T,T,T,T,T,T,W,W,W
W,W,W,W,W,W,W,W,W,W,W,W,W,W,W,W,W
W,W,W,W,W,W,W,W,W,W,W,W,W,W,W,W,W
W,W,W,W,W,W,W,W,W,W,W,W,W,W,W,W,W
W,W,W,W,W,W,W,W,W,W,W,W,W,W,W,W,W
W,W,T,T,T,T,T,T,T,C,C,C,C,C,W,W,W
W,W,T,T,T,T,T,T,T,C,C,C,C,C,W,W,W
W,W,T,T,T,T,T,T,T,C,C,C,C,C,W,W,W
W,W,T,T,T,T,T,T,T,C,C,C,C,C,W,W,W
W,W,T,T,T,T,T,T,T,C,C,C,C,C,W,W,W
W,W,W,W,W,W,W,W,W,W,W,W,W,W,W,W,W
W,W,W,W,W,W,W,W,W,W,W,W,W,W,W,W,W

Feather Interfaces Between Text/Color Areas

When areas of text and color are adjacent, objectionable artifacts may be produced at the boundary if special considerations are not taken. One method of eliminating the artifacts is to "feather" the transitions between the text and color regions.

For instance, consider a region as follows:

W,W,T,T,T,T,T,T,C,C,C,C,C,C,W,W,W
W,W,T,T,T,T,T,T,C,C,C,C,C,C,W,W,W
W,W,T,T,T,T,T,T,C,C,C,C,C,C,W,W,W
W,W,T,T,T,T,T,T,C,C,C,C,C,C,W,W,W
W,W,T,T,T,T,T,T,C,C,C,C,C,C,W,W,W

By expanding the color region treatment to extend within the areas identified to be text, the boundary artifacts can be reduced. Consider a technique which treats as color, T regions which are within 2 regions of a C region. These regions are marked below as "c".

W,W,T,T,T,T,T,c,c,C,C,C,C,C,W,W,W
W,W,T,T,T,T,c,c,c,C,C,C,C,C,W,W,W
W,W,T,T,T,c,c,c,C,C,C,C,C,C,W,W,W
W,W,T,T,c,c,C,C,C,C,C,C,C,C,W,W,W
W,W,T,T,c,c,C,C,C,C,C,C,C,C,W,W,W

More complicated feathering can also be performed which treats the "c" regions at the boundary between C and T regions partially as text regions and partially as color regions, with the weighting determined by the distance of the region from the true C/T regions. For instance:

W,W,T,T,T,T,T,t,c,C,C,C,C,C,W,W,W
W,W,T,T,T,T,t,c,c,C,C,C,C,C,W,W,W
W,W,T,T,T,c,c,c,C,C,C,C,C,C,W,W,W
W,W,T,T,t,c,C,C,C,C,C,C,C,C,W,W,W
W,W,T,T,t,c,C,C,C,C,C,C,C,C,W,W,W where:

T=full text treatment t=⅔ text treatment, ⅓ color treatment (partial text treatment)

c=⅓ text treatment, ⅔ color treatment (partial text treatment)

C=full color treatment

Text Enhancement (Color Drop To Black Drop Conversion)

One of the objectionable artifacts of text characters as generated by typical color image processing is that the edges of text often have a "halo" of color drops. In addition, in thin sections of characters, there may be locations in which the black of the character was mapped primarily to composite black (i.e., a mix of CMY drops with few black drops) rather than K drops. To simply remove these color drops would cause the characters to be thinned and discontinuous in spots. Instead, a technique is employed with the goal to converting color drops which are part of text characters to black drops, while eliminating stray color drops which are not associated with text characters.

Again, a variety of techniques could be used to achieve this goal. A preferred approach is to inspect the neighborhood of each color drop. If a color drop has any immediate neighbor positions (i.e., up, down, left, or right) which also have drops present (C, M, Y or K) then it is assumed that the drop is NOT a stray drop and it is converted into a black drop.

Text enhancement via color drop to black drop conversion is only performed for regions which are identified as text regions. For partial text regions, the conversion is performed on a pro-rata basis, converting a fraction of the color drops in proportion to the fractional text treatment of the region.

Text Enhancement (Black Strengthening)

In many cases, the black within text characters is not as vibrant as it could be. The text can be made more vibrant by increasing the density of K drops within the dark regions of the characters.

To achieve this goal, the K image for a region (after color drop to black drop conversion) is taken and a logical OR operation is employed with itself after jittering its position slightly. For instance, KimageOut=
Kimage|
(Kimage shifted up one pixel)|
(Kimage shifted down one pixel)|
(Kimage shifted left one pixel)|
(Kimage shifted right one pixel);

Text enhancement via black strengthening is only performed for regions which are identified as text regions (or on a pro-rata basis for those regions which are to be treated as partial text).

Color Dot Removal

Next, the color drops are removed. Again, this is only performed for regions which are identified as text regions (or on a pro-rata basis for those regions which are to be treated as partial text). For regions which are identified as text regions, all color drops within the region are removed.

Summary Map Generation

Finally, a summary map is created for use by the ink jet formatter component. For each region, the summary map will indicate whether the region is (1) all white, (2) contains black drops only or (3) contains at least some color drops (and optionally black drops).

The formatter may then choose to use the summary map to accelerate the formatting process by:

(1) quickly skip past white regions of the image; and (2) dynamically switch to use a higher speed, black only formatting mode for those regions of the image which have only black drops.

What is claimed is:

1. A method, comprising:
   receiving a data image of a document, wherein the data image comprises at least one plane of data for each of cyan, magenta, yellow and black ink types;
   classifying each of a plurality of rectangular regions of the data image as one of a text region, a color region, and a white region;
   identifying boundaries between color regions and text regions; and
   modifying the data image to designate a plurality of partial text regions, wherein each of the plurality of partial text regions receives a fractional text treatment, wherein the fractional text treatment is determined based on a distance of the partial text region from at least one of the identified boundaries.

2. The method of claim 1, wherein modifying the data image comprises:
   converting a portion of color dots to black dots, wherein the portion is determined based on the fractional text treatment.

3. The method of claim 2, wherein the portion of color dots converted to black dots is one-third when the distance of the partial text region from at least one of the identified boundaries is one region.

4. The method of claim 2, wherein the portion of color dots converted to black dots is two-thirds when the distance of the partial text region from at least one of the identified boundaries is two regions.

5. The method of claim 2, further comprising:
converting a portion of color dots adjacent to black dots into black dots, wherein the portion of color dots is determined based on the fractional text treatment.

6. The method of claim 5, wherein the portion of color dots converted to black dots is one-third when the distance of the partial text region from at least one of the identified boundaries is one region.

7. The method of claim 5, wherein the portion of color dots converted to black dots is two-thirds when the distance of the partial text region from at least one of the identified boundaries is two regions.

8. The method of claim 2, further comprising:
removing a portion of color dots, wherein the portion is determined based on the fractional text treatment.

9. The method of claim 8, wherein the portion of color dots removed is one-third when the distance of the partial text region from at least one of the identified boundaries is one region.

10. The method of claim 8, wherein the portion of color dots removed is two-thirds when the distance of the partial text region from at least one of the identified boundaries is two regions.

11. The method of claim 1, wherein classifying each of the plurality of rectangular regions comprises classifying each of the plurality of rectangular regions based on one or more of:
a number of ink dots within the rectangular region;
a type of ink dots within the rectangular region;
a number of ink dots in regions adjacent to the rectangular region being classified; and
a type of ink dots in regions adjacent to the rectangular region being classified.

12. The method of claim 1, wherein each of the plurality of rectangular regions is classified as having one of:
no dots of any ink type;
interspersed dots of any ink type;
mostly black dots; and
mostly color dots.

13. The method of claim 12, wherein a rectangular region is classified as a text region when:
the rectangular region is classified as having mostly black dots; and
the rectangular region is horizontally adjacent to one of:
a rectangular region classified as having no dots of any ink type;
a rectangular region classified as having interspersed dots of any ink type; and
a rectangular region capable of being classified as a text region.

14. The method of claim 12, wherein a rectangular region is classified as a text region when:
the rectangular region is classified as having interspersed dots of any ink type; and
the rectangular region is horizontally adjacent to a rectangular region that is classified as having mostly black dots and that is capable of being classified as a text region.

15. The method of claim 1, further comprising:
creating a summary map that classifies each rectangular region as having one of:
no dots of any color;
black dots only; and
at least one color dot; and
providing the summary map to an ink jet formatter component to produce a copy of the document.

16. A computer-readable medium encoded with computer executable
instructions that, when executed by a processor, cause the processor to:
receive a data image of a document, wherein the data image comprises at least one plane of data for each of cyan, magenta, yellow and black ink types;
classify each of a plurality of rectangular regions of the data image as one of a text region, a color region, and a white region;
identify boundaries between color regions and text regions; and
modify the data image to designate a plurality of partial text regions, wherein each of the plurality of partial text regions receives a fractional text treatment, wherein the fractional text treatment is determined based on a distance of the partial text region from at least one of the identified boundaries.

17. The computer-readable medium of claim 16, further comprising instructions that, when executed by a processor, cause the processor to:
convert a portion of color dots to black dots, wherein the portion is determined based on the fractional text treatment.

18. The computer-readable medium of claim 17, further comprising instructions that, when executed by a processor, cause the processor to:
convert a portion of color dots adjacent to black dots into black dots, wherein the portion of color dots is determined based on the fractional text treatment.

19. The computer-readable medium of claim 17, further comprising instructions that, when executed by a processor, cause the processor to:
remove a portion of color dots, wherein the portion is determined based on the fractional text treatment.

20. A system, comprising:
a receiving module to receive a data image of a document, wherein the data image comprises at least one plane of data for each of cyan, magenta, yellow and black ink types;
a classification module to classify each of a plurality of rectangular regions of the data image as one of a text region, a color region, and a white region;
a boundary identification module to identify boundaries between color regions and text regions; and
a modification module to modify the data image to designate a plurality of partial text regions, wherein each of the plurality of partial text regions receives a fractional text treatment, wherein the fractional text treatment is determined based on a distance of the partial text region from at least one of the identified boundaries.

* * * * *

UNITED STATES PATENT AND TRADEMARK OFFICE
CERTIFICATE OF CORRECTION

PATENT NO. : 7,453,600 B1
APPLICATION NO. : 11/032615
DATED : November 18, 2008
INVENTOR(S) : Walton et al.

It is certified that error appears in the above-identified patent and that said Letters Patent is hereby corrected as shown below:

Column 1, Line 4 reads, "REFERENCE TO PRIOR PATENT APPLICATION" which should read, "REFERENCE TO PENDING PRIOR PATENT APPLICATION"

Column 1, Line 6 reads, "...claims benefit of prior U.S. Provisional..." which should read, "...claims benefit of pending prior U.S. Provisional..."

Column 5, Line 39 reads, "...(i) purewhite..." which should read, "...(i) pureWhite..."

Column 5, Line 50 reads, "if (sumOverRegion(c,m,y,k)==0" which should read, "if (sumOverRegion(c,m,y,k)==0)"

Column 5, Line 53 reads, "else if (sumover3x3(c,m,y,k)" which should read, "else if (sumOver3x3(c,m,y,k)"

Column 5, Line 53 reads, "...<Constant0" which should read, "...>Constant0)"

Column 5, Line 59 reads, ".../sumover3x3..." which should read, ".../sumOver3x3..."

Column 6, Line 1 reads, "...and Constant0,...," which should read, "...and constant0,...,"

Column 7, Line 4 reads, "W,W,T,T,T,T,T,T..." which should read, "W,W,T,T,T,T,T,C..."

Column 7, Line 5 reads, "...T,T,T,T,T,T,C,C,C,C,C,C..." which should read, "...T,T,T,T,C,C,C,C,C,C,C,C..."

Column 7, Line 6 reads, "...T,T,T,T,T,T,C,C,C,C,C,C..." which should read, "...T,T,T,T,C,C,C,C,C,C,C,C..."

Signed and Sealed this

Sixth Day of July, 2010

David J. Kappos
*Director of the United States Patent and Trademark Office*

Column 10, Lines 13-14 reads, "A computer-readable medium encoded with computer executable
instructions that..." which should read, "A computer-readable medium encoded with computer executable instructions that..."